United States Patent
Lee (10) Patent No.: US 9,444,507 B2
(45) Date of Patent: Sep. 13, 2016

(54) WATERPROOF STRUCTURE FOR USE WITH ELECTRONIC DEVICE

(71) Applicant: GETAC TECHNOLOGY CORPORATION, Hsinchu County (TW)

(72) Inventor: Gwo-Shiang Lee, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 14/819,372

(22) Filed: Aug. 5, 2015

(65) Prior Publication Data
US 2016/0156379 A1    Jun. 2, 2016

Related U.S. Application Data

(60) Provisional application No. 62/085,288, filed on Nov. 27, 2014.

(30) Foreign Application Priority Data

Apr. 1, 2015  (CN) ........................ 2015 1 0152553

(51) Int. Cl.
*H04M 1/00* (2006.01)
*H04B 1/3888* (2015.01)
*H04B 1/38* (2015.01)

(52) U.S. Cl.
CPC ..... *H04B 1/3888* (2013.01); *H04B 2001/3894* (2013.01)

(58) Field of Classification Search
CPC .... H04M 1/18; H04M 1/185; H04M 1/0202; H04M 1/0249; H04M 1/0274; H05K 5/0013; H05K 5/061; H05K 5/0004; H05K 5/0017; H05K 5/0217; H05K 5/0221; H05K 5/06; H05K 5/069
See application file for complete search history.

(56) References Cited

U.S. PATENT DOCUMENTS

| | | | | |
|---|---|---|---|---|
| 8,342,325 | B2* | 1/2013 | Rayner | G06F 1/1626 206/305 |
| 2013/0273985 | A1* | 10/2013 | Kageyama | H04M 1/0202 455/575.8 |
| 2014/0206420 | A1* | 7/2014 | Neichi | H04M 1/0249 455/575.8 |
| 2014/0274232 | A1* | 9/2014 | Tages | H04B 1/3888 455/575.8 |
| 2015/0062787 | A1* | 3/2015 | Wilson | H04M 1/185 361/679.01 |
| 2015/0257285 | A1* | 9/2015 | Wilson | H04M 1/18 224/235 |

* cited by examiner

*Primary Examiner* — Golam Sorowar (57) ABSTRACT

A waterproof structure for use with an electronic device is provided. The electronic device has a gap. The waterproof structure includes a casing and a waterproof gasket. The casing encloses a periphery of the electronic device. The waterproof gasket is clamped between the casing and the electronic device. The waterproof gasket includes a fixing portion fixed to the casing and a first abutting portion and a second abutting portion which extend from the fixing portion. The first abutting portion and the second abutting portion abut against two opposite sides of the gap of the electronic device, respectively. Hence, the waterproof structure prevents liquid from seeping into the electronic device through the gap or even so in case of jerks or vibrations.

12 Claims, 9 Drawing Sheets

WATERPROOF STRUCTURE FOR USE WITH ELECTRONIC DEVICE

BACKGROUND OF THE INVENTION

1. Field of the Invention

The present invention relates to waterproof structures, and more particularly, to a waterproof structure for use with an electronic device.

2. Description of the Prior Art

Electronic devices, such as satellite navigation devices, smartphones, and tablets, each comprise a body, a display panel disposed on the surface of the body, and connectors embedded at the bottom side or the periphery of the body. Since the connectors are not airtight, external liquid is likely to seep into electronic devices through the connectors to therefore damage the electronic devices. In view of this, some manufacturers develop a waterproof casing for fitting around an electronic device to prevent liquid from seeping into the electronic device through the connectors.

However, the conventional waterproof casing provides protection to the bottom side and the periphery of the electronic device rather than a gap formed between the border of the display panel and the body; as a result, liquid can still seep into the electronic device through the gap.

Liquid, such as rainwater, is much more likely to accumulate between the waterproof casing and the electronic device to thereby seep into the electronic device through the gap, if the electronic device is disposed on an outdoor open-top vehicle, such as a bicycle or a motorbike. It is because, in the aforesaid circumstances, the display panel is always oriented upward and fixed in place.

Furthermore, the conventional waterproof casing and the electronic device engage with each other, albeit loosely. Although the engagement between the conventional waterproof casing and the electronic device can be improved to give considerations to the gap, it has a drawback as follows: in the situation where the aforesaid vehicle jolts or shakes while traveling on bumpy roads, the engagement between the conventional waterproof casing and the electronic device tends to open and then close instantaneously, and in consequence an invasion of the accumulated rainwater happens instantaneously, thereby still allowing it to seep into the electronic device through the gap.

SUMMARY OF THE INVENTION

It is an objective of the present invention to provide a waterproof structure for use with an electronic device to prevent liquid from seeping into the electronic device through a gap.

Another objective of the present invention is to provide a waterproof structure for use with an electronic device to prevent liquid from seeping into the electronic device through the gap even in the event of jerks or vibrations.

In order to achieve the above and other objectives, the present invention provides a waterproof structure for use with an electronic device. The electronic device has a gap. The waterproof structure comprises: a casing for enclosing a periphery of the electronic device; and a waterproof gasket clamped between the casing and the electronic device and comprising a fixing portion fixed to the casing and a first abutting portion and a second abutting portion which extend from the fixing portion, wherein the first abutting portion and the second abutting portion span the gap and abut against two opposite sides of the gap, respectively.

Compared with the prior art, the present invention has advantages as follows: with the waterproof gasket corresponding in position to the gap of the electronic device, liquid is prevented from seeping into the electronic device through the gap; and the first abutting portion and the second abutting portion abut against the electronic device so tightly that the liquid is prevented from seeping into the electronic device through the gap even in case of jerks or vibrations.

DETAILED DESCRIPTION OF THE EMBODIMENTS

The description and technical solution of the present invention is presented below in conjunction with drawings. However, the drawings are illustrative rather than restrictive of the present invention.

Figure 6:
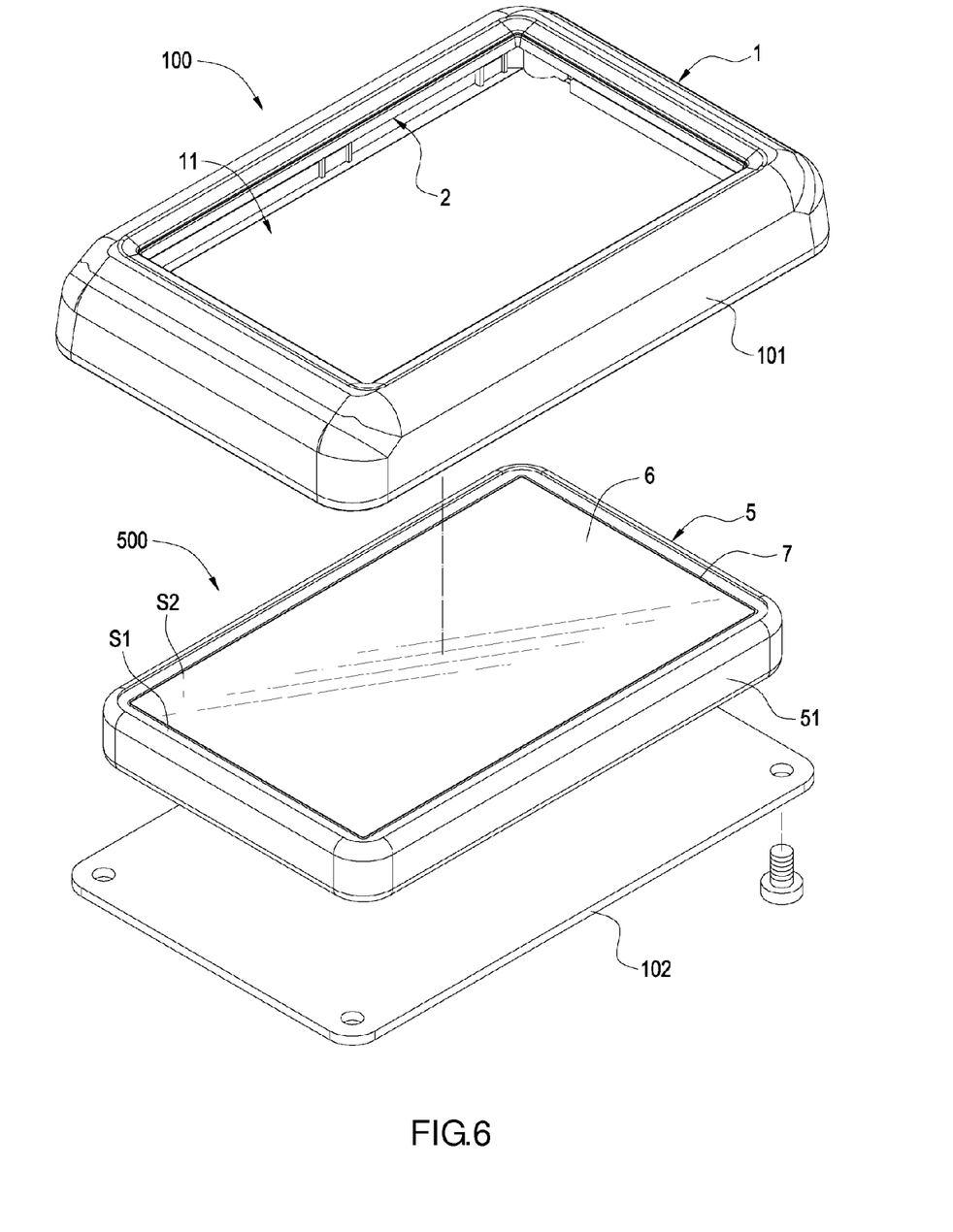
FIG. 6 is an exploded view of the waterproof structure (with its base shown) and an electronic device according to the first embodiment of the present invention.

The present invention provides a waterproof structure for use with an electronic device to waterproof a gap of the electronic device. An electronic device 500, such as a satellite navigation device, a smartphone, or a tablet, has a display panel. Referring to FIG. 6, the electronic device 500 has a body 5, a display panel 6 disposed on the surface of the body 5, and a gap 7 formed between a border of the display panel 6 and the body 5. The body 5 further has a periphery 51.

Referring to FIG. 1, FIG. 2, FIG. 3, FIG. 6, and FIG. 7, in the first embodiment of the present invention, a waterproof structure 100 comprises a casing 1 and a waterproof gasket 2.

Figure 7:
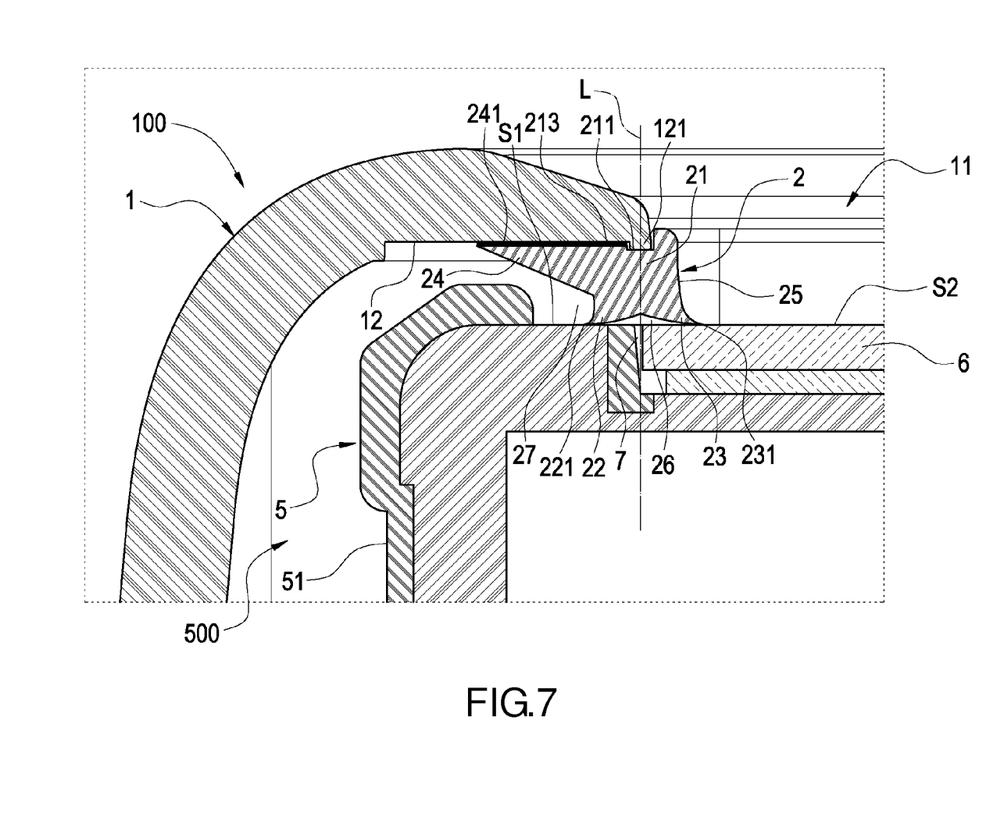
FIG. 7 is a partial cross-sectional view of the assembled waterproof structure with reference to FIG. 6 according to the present invention.

The casing 1 encloses the periphery 51 of the electronic device 500 (as shown in FIG. 6 and FIG. 7) and has an opening 11 corresponding in position to the display panel 6 of the electronic device 500 such that the display panel 6 is exposed from the opening 11. The casing 1 further has an inward surface 12 for pressing indirectly against the electronic device 500.

The waterproof gasket 2 is clamped between the casing 1 and the electronic device 500 (as shown in FIG. 7) and has an inner edge 25 and an outer edge (not shown) opposing the inner edge 25. The waterproof gasket 2 comprises a fixing portion 21, a first abutting portion 22, and a second abutting portion 23. In this embodiment, the waterproof gasket 2 further comprises an extending portion 24 for illustrative sake.

Figure 1:
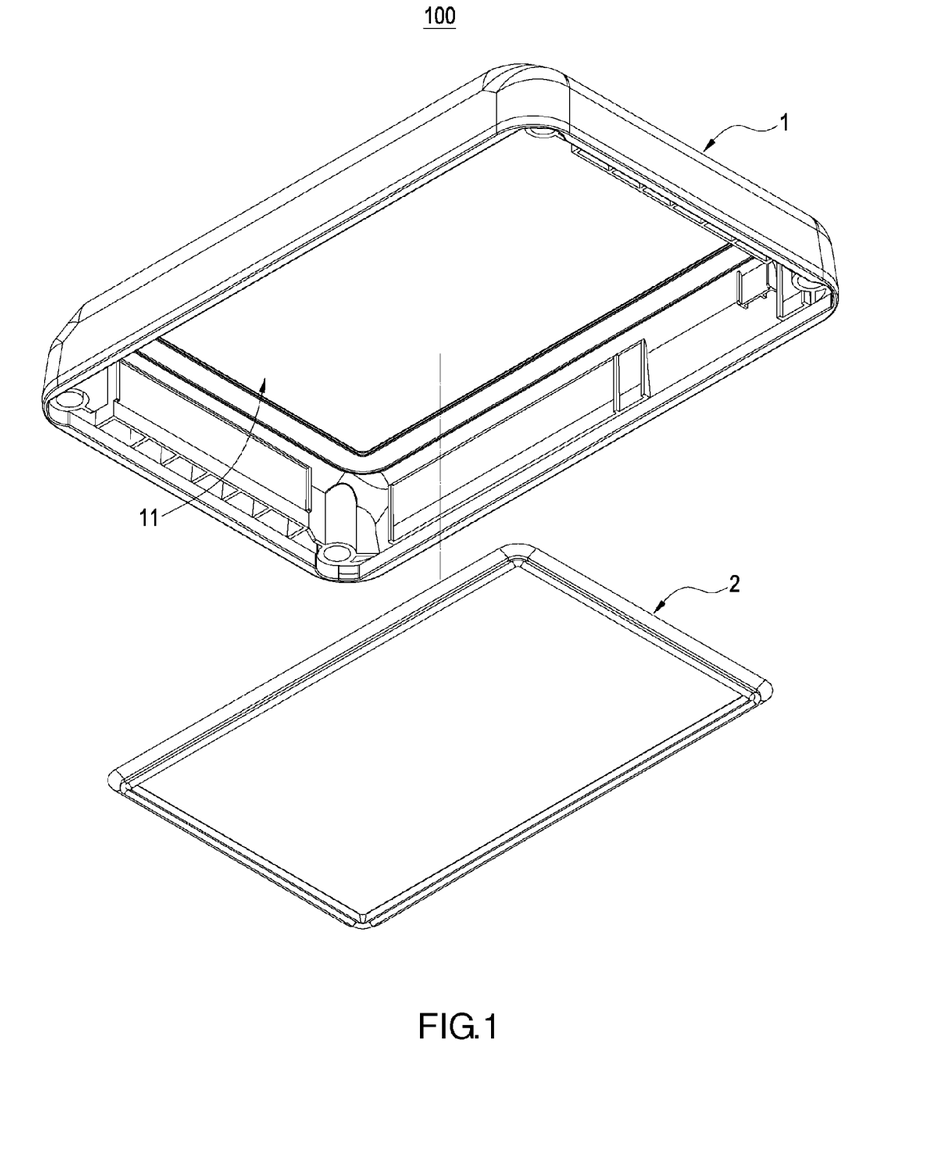
FIG. 1 is an exploded view of a waterproof structure (with its base not shown) according to the first embodiment of the present invention.
Figure 2:
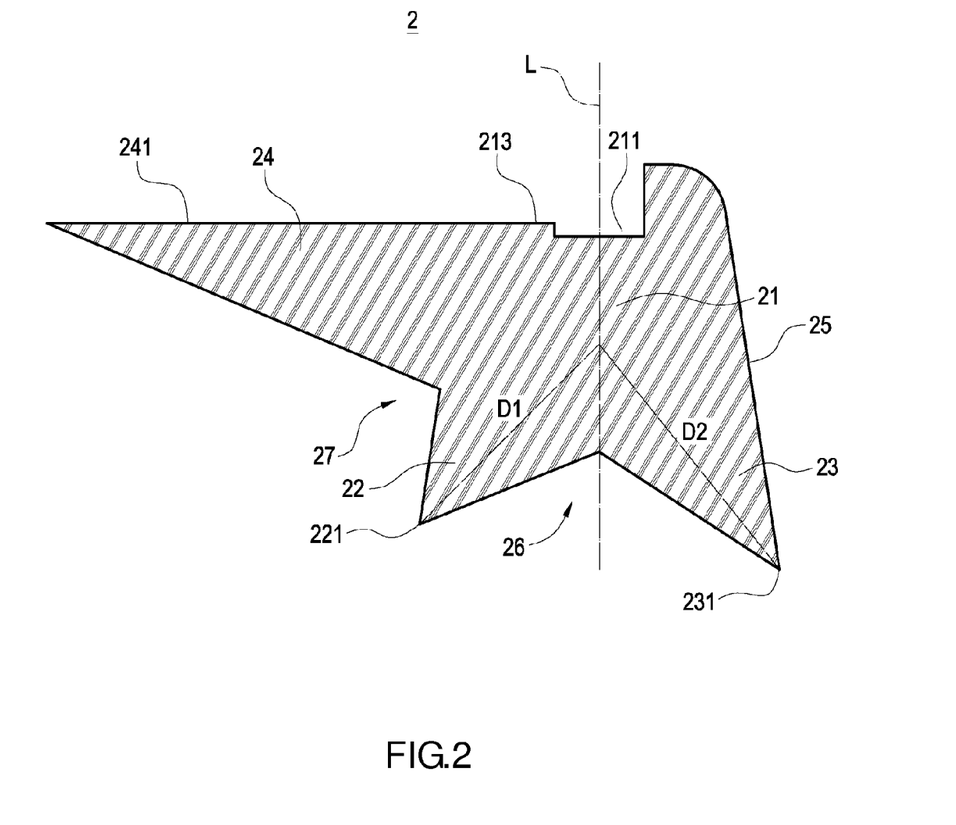
FIG. 2 is a cross-sectional view of a waterproof gasket of the waterproof structure according to the first embodiment of the present invention.
Figure 3:
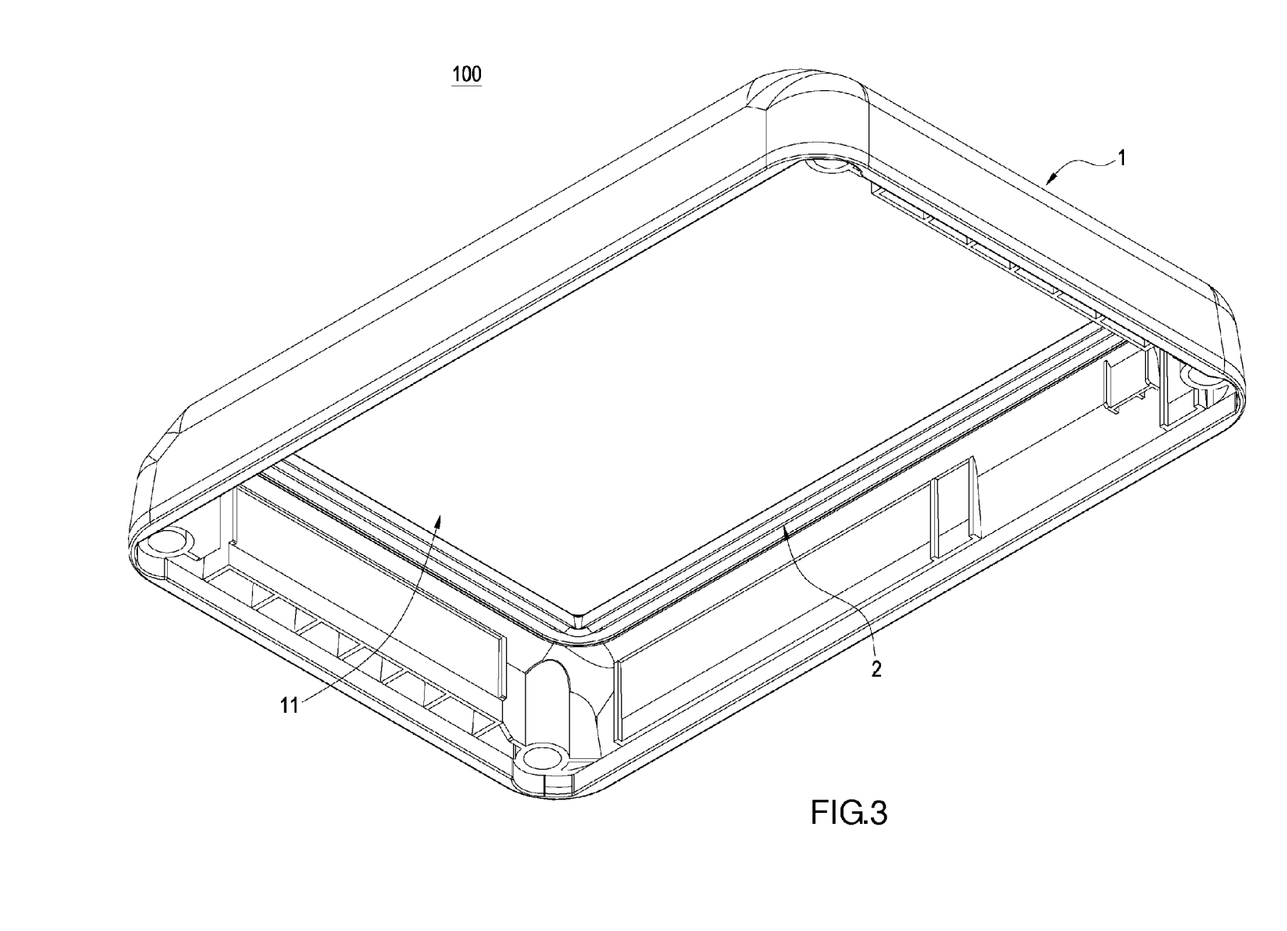
FIG. 3 is a bottom perspective view of the assembled waterproof structure shown in FIG. 1 according to the present invention.
Figure 4:
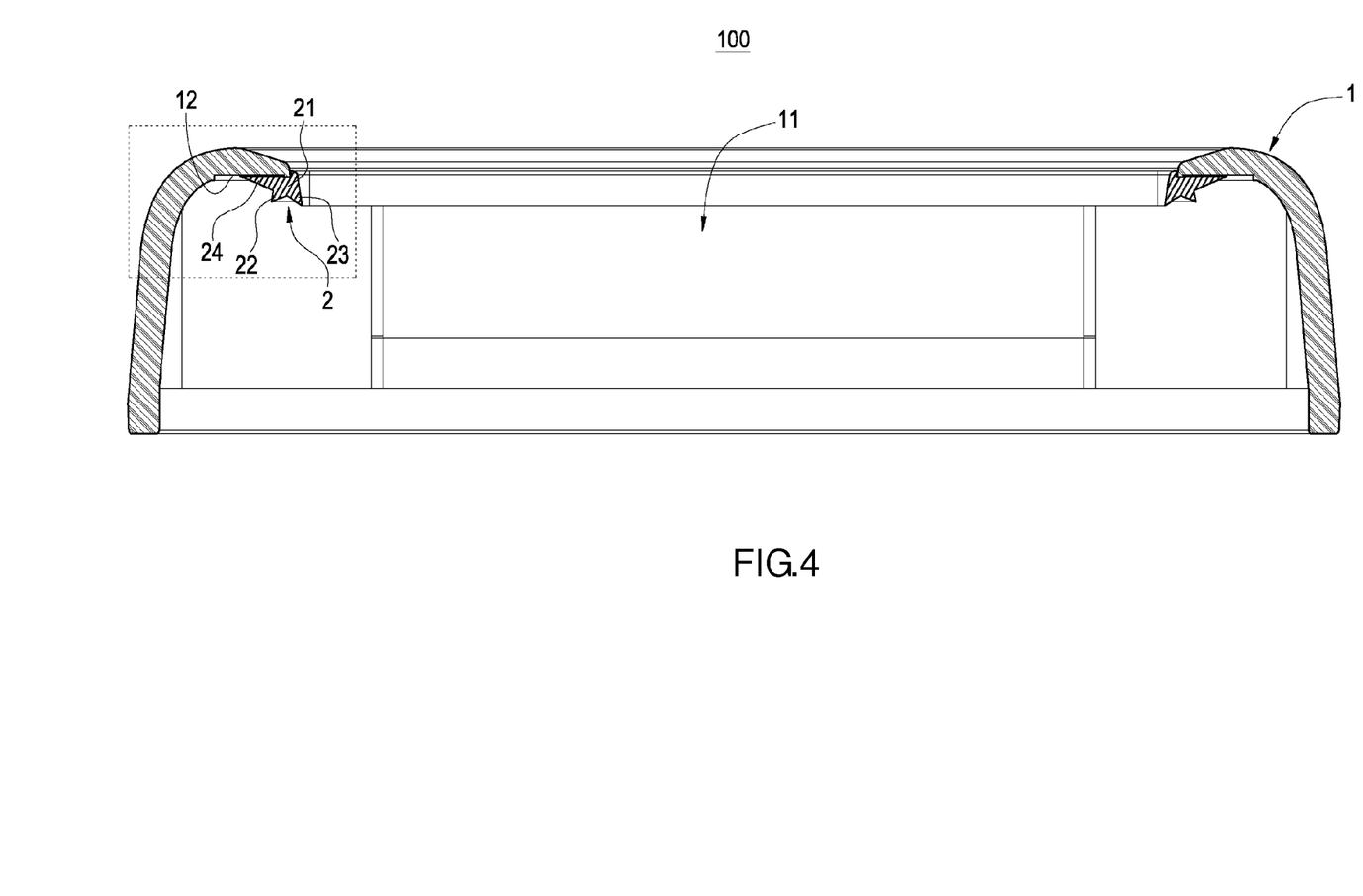
FIG. 4 is a cross-sectional view with reference to FIG. 3 according to the present invention.
Figure 5:
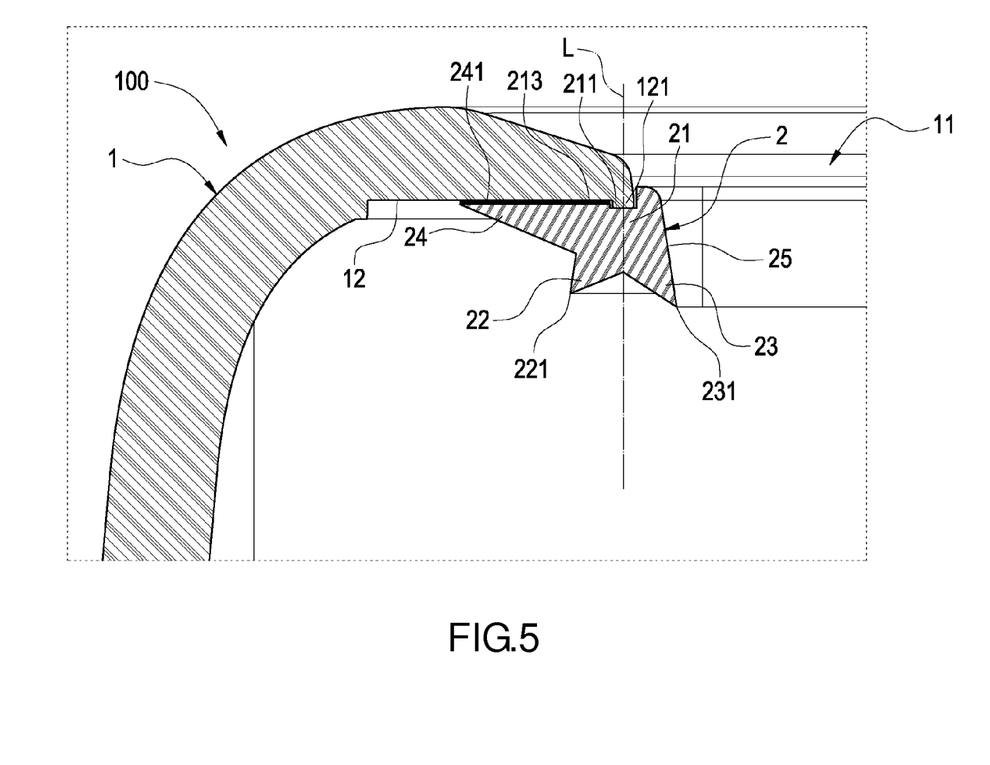
FIG. 5 is a partial enlarged view with reference to FIG. 4 according to the present invention.

Referring to FIG. 2, FIG. 4, and FIG. 5, the fixing portion 21 is adapted to be fixed to the casing 1. The extending portion 24 extends integrally in the direction from the fixing portion 21 to the outer edge. Respectively, the fixing portion 21 and the extending portion 24 have top surfaces 213, 241 corresponding in position to the inward surface 12 such that the waterproof gasket 2 is fixed to the inward surface 12 of the casing 1 through the top surface 213 of the fixing portion 21 and the top surface 241 of the extending portion 24. The aforesaid fixation is achieved by whatever appropriate means, but the present invention is not limited thereto. In this embodiment, the aforesaid fixation is achieved by an adhesive agent or an adhesive (as shown in the diagrams).

In this embodiment, the thick fixing portion 21 has a first positioning portion 211 for serving a positioning purpose. The inward surface 12 of the casing 1 has a second positioning portion 121 corresponding in position to the first positioning portion 211. The first positioning portion 211 and the second positioning portion 121 are coupled together such that the fixing portion 21 of the waterproof gasket 2 can be positioned in the casing 1. Specifically speaking, the first positioning portion 211 is a groove, whereas the second positioning portion 121 is a rib corresponding in position to the groove, and vice versa, such that the groove of the waterproof gasket 2 is positioned as a result when the rib of the casing 1 is inserted into the groove of the waterproof gasket 2. Since the first positioning portion 211 and the second positioning portion 121 are coupled to each other, the waterproof gasket 2 is precisely positioned on the inward surface 12 of the casing 1 to thereby correspond in position to the gap 7 of the electronic device 500 accurately, thus facilitating waterproofing.

Since the first abutting portion 22 and the second abutting portion 23 extend integrally in the direction from the fixing portion 21 to the display panel 6 and are opposite each other, a first recess 26 is formed between the first abutting portion 22 and the second abutting portion 23, and a second recess 27 is formed between the first abutting portion 22 and the extending portion 24, wherein the first abutting portion 22 is disposed between the first recess 26 and the second recess 27. Hence, both the first abutting portion 22 and the second abutting portion 23 are thinner than the fixing portion 21 and thus bend spontaneously and resiliently when compressed by the casing 1.

The first abutting portion 22 and the second abutting portion 23 are opposite each other; hence, the waterproof gasket 2 is steadily underpinned by the electronic device 500 and thus does not rotate, for example, about the first positioning portion 211. Therefore, the waterproof gasket 2 does not rotate and thus deviate under a compression force applied by the casing 1. If the waterproof gasket 2 deviates, the waterproofing effect will abate or even abort.

The waterproof gasket 2 further defines a central line L. The central line L is disposed between the first abutting portion 22 and the second abutting portion 23 and corresponds in position to the gap 7. Hence, the first abutting portion 22 and the second abutting portion 23 span the gap 7 of the electronic device 500 and abut against two opposite sides (a first opposite side S1 and a second opposite side S2 as shown in FIG. 6) of the gap 7 of the electronic device 500, respectively.

Referring to FIG. 6 and FIG. 7, the casing 1 comprises a shade frame 101 and a base 102 which can be coupled together. The shade frame 101 also has the opening 11 and the inward surface 12. The electronic device 500 is received snugly between the shade frame 101 and the base 102 such that the waterproof gasket 2 is clamped between the casing 1 and the electronic device 500 and thus deformed accordingly.

Regarding the waterproof gasket 2, the first abutting portion 22 has a first abutting end 221, whereas the second abutting portion 23 has a second abutting end 231. When the waterproof gasket 2 is clamped between the casing 1 and the electronic device 500, the first abutting end 221 of the first abutting portion 22 abuts against the first opposite side S1 of the electronic device 500, whereas the second abutting end 231 of the second abutting portion 23 abuts against the second opposite side S2 of the electronic device 500, and in consequence the gap 7 is disposed between the first abutting end 221 and the second abutting end 231 to allow the first abutting end 221 and the second abutting end 231 to span the gap 7 and abut against the first opposite side S1 and the second opposite side S2, respectively, thereby effecting waterproofing. Hence, according to the present invention, a waterproof line (defined at the second abutting portion 23) of the waterproof structure 100 is disposed in front of the gap 7 to ensure that no external liquid can intrude into the gap 7.

The inner edge 25 of the waterproof gasket 2 is provided in the form of an oblique surface. If the display panel 6 of the electronic device 500 stands vertically or obliquely relative to the ground, external liquid can slide downward from the upper end of the oblique surface (i.e., the inner edge 25) to the lower end of the oblique surface (i.e., the inner edge 25) smoothly to therefore prevent the liquid from accumulating at the waterproof gasket 2 or between the waterproof gasket 2 and the electronic device 500, thereby reducing the likelihood of dust accumulation.

Referring to FIG. 2, the first abutting end 221 of the waterproof gasket 2 is spaced apart from the fixing portion 21 by a first distance D1, whereas the second abutting end 231 is spaced apart from the fixing portion 21 by a second distance D2, with the second distance D2 being larger than the first distance D1, such that the second abutting portion 23 is farther away from the fixing portion 21 than the first abutting portion 22 is. Hence, when the waterproof gasket 2 is compressed by the casing 1, the second abutting portion 23 is resiliently deformed to an extent larger than the first abutting portion 22, whereas the second abutting portion 23 surpasses the first abutting portion 22 in the strength of abutting against the electronic device 500, waterproofing, and tightness, thereby allowing the second abutting portion 23 to fend off external liquid.

Figure 8:
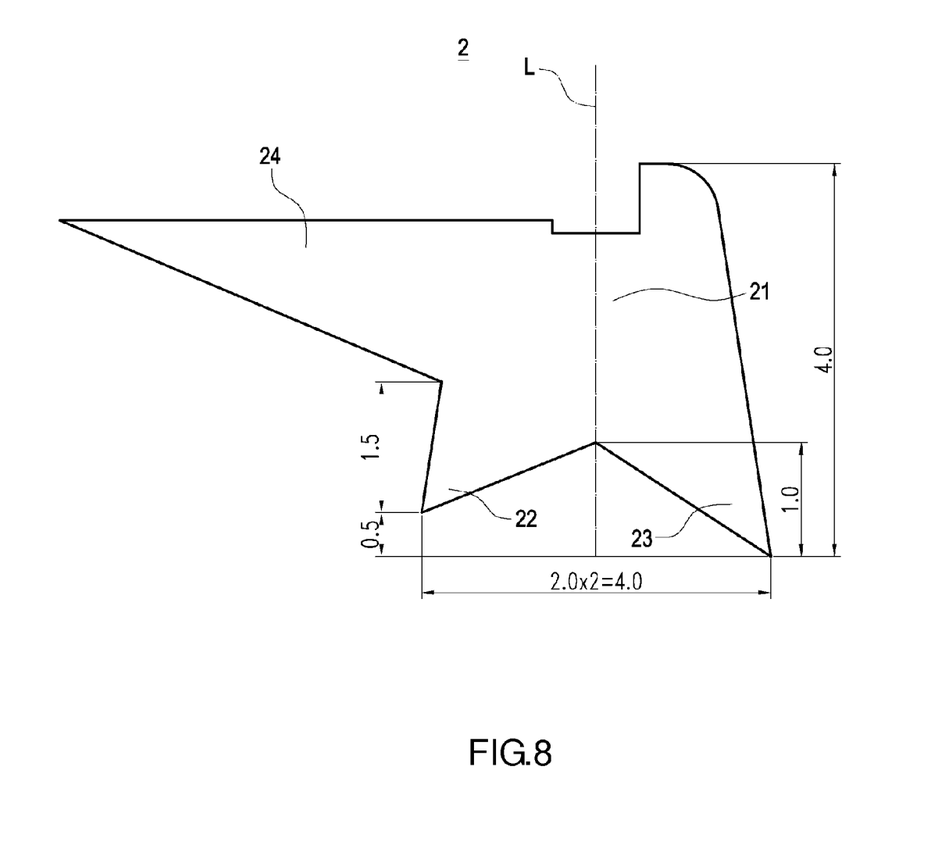
FIG. 8 is a schematic view of various data pertaining to the waterproof gasket of the waterproof structure according to the first embodiment of the present invention.

FIG. 8 is a schematic view of various data pertaining to the waterproof gasket 2 of the waterproof structure according to the first embodiment of the present invention. As shown in the diagram, the waterproof gasket 2 is 4.0 mm thick at the second abutting portion 23, and the second abutting portion 23 is 1.0 mm thick. Given the aforesaid data, the thickness to compression ratio of the waterproof gasket 2 is calculated to be 25.0% (1.0/4.0), but the present invention is not limited thereto.

Figure 9:
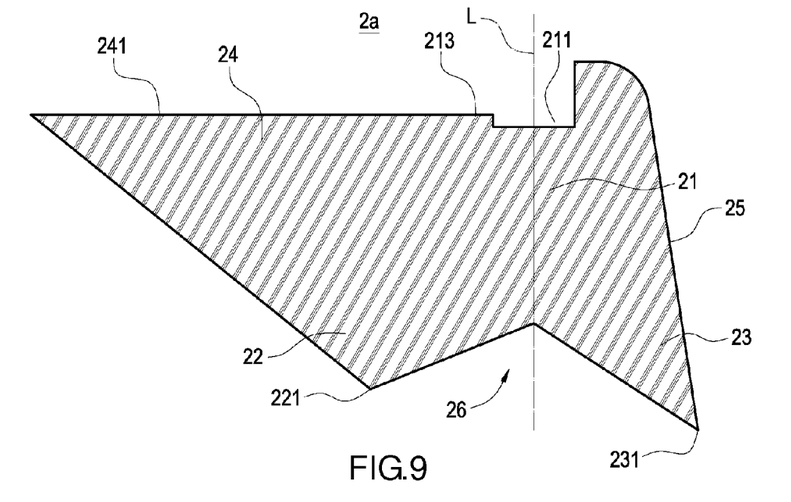
FIG. 9 is a cross-sectional view of another waterproof gasket of the waterproof structure according to the second embodiment of the present invention.

FIG. 9 depicts the waterproof structure 100 according to the second embodiment of the present invention. The second embodiment is substantially identical to the first embodiment except that a waterproof gasket 2a in the second embodiment is slightly different from the waterproof gasket 2 in the first embodiment.

The second embodiment features filling the space otherwise defined between the first abutting portion 22 and the extending portion 24 of the waterproof gasket 2a, and thus the second recess 27 (shown in FIG. 2) no longer exists. Despite the aforesaid feature, the waterproof gasket 2a in the second embodiment remains as advantageous as its counterpart in the first embodiment.

Figure 10:
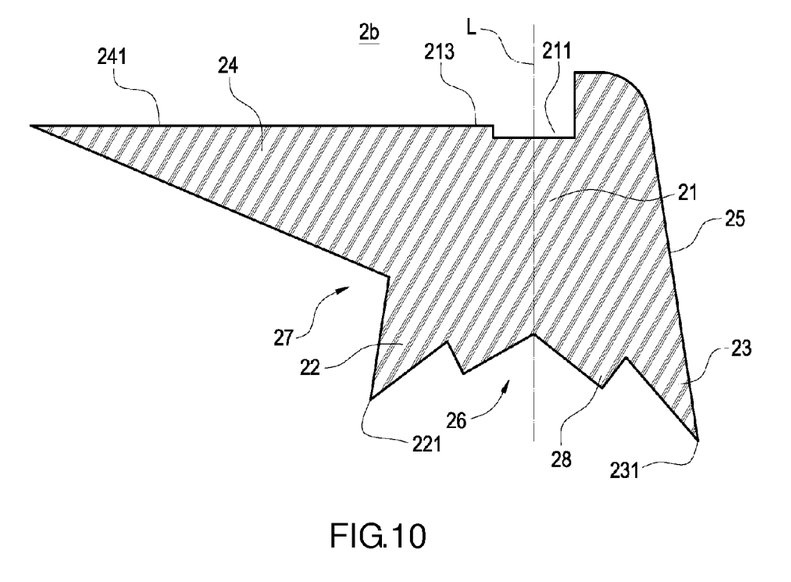
FIG. 10 is a cross-sectional view of yet another waterproof gasket of the waterproof structure according to the third embodiment of the present invention.

FIG. 10 depicts the waterproof structure 100 according to the third embodiment of the present invention. The third embodiment is substantially identical to the first embodiment except that a waterproof gasket 2b in the third embodiment is slightly different from the waterproof gasket 2 in the first embodiment.

In the third embodiment, a plurality of serrate third abutting portions 28 is disposed at the waterproof gasket 2b and corresponds in position to the first recess 26. In this embodiment, the first abutting portion 22 and the second abutting portion 23 are counterparts to each other, whereas the third abutting portions 28 are counterparts to each other to therefore increase the waterproof lines. Hence, even if the second abutting portion 23 functioning as a first waterproof line gets damaged, the third abutting portions 28 functioning as a second waterproof line, a third waterproof line, and so forth, can guard the gap 7 successively to therefore effectuate waterproofing by multiple waterproof lines.

The embodiments of the present invention have features as follows:

1. Both the first positioning portion 211 and the second positioning portion 121 of the waterproof gasket 2 (2a, 2b) are located at the central line L to serve as points of application of a force for use in the compression of the casing 1. The second positioning portion 121 is disposed between the first abutting portion 22 and the second abutting portion 23 and corresponds in position to the gap 7 of the electronic device 500 to ensure that the second positioning portion 121 can face the gap 7 during the compression process, thereby preventing the waterproof gasket 2 (2a, 2b) from rotating or deviating.

2. The first recess 26 and the second recess 27 are provided such that the first abutting portion 22, the second abutting portion 23, and the extending portion 24 of the waterproof gasket 2 (2a, 2b) are triangular ridges to thereby be thinner than the fixing portion 21, and in consequence the triangular ridges deform readily in response to compression. Moreover, the first abutting portion 22 and the second abutting portion 23 are triangular ridges and thus form two abutting legs, respectively, which are spaced apart from, but adjacent to, each other.

In conclusion, compared with the prior art, the present invention has an advantage, that is, the waterproof gasket 2 (2a, 2b) corresponds in position to the gap 7 of the electronic device 500 and thus prevents liquid from seeping into the electronic device 500 through the gap 7. The waterproof gasket 2 (2a, 2b) is characterized advantageously in that the first abutting portion 22 and the second abutting portion 23, which abut against the electronic device 500, are thinner than the fixing portion 21 to therefore enhance flexibility and tightness. The first abutting portion 22 and the second abutting portion 23 stretch resiliently and then bend resiliently even when the electronic device 500 is disposed on an open-top vehicle traveling with jerks or vibrations. At the instant of a jerk or vibration, no opening or closing gap between the waterproof gasket 2 (2a, 2b) and the electronic device 500 can develop, thereby ensuring that waterproofing persists. Last but not least, the present invention has the other advantages, for example, allowing the gap 7 to fend off external liquid and not to accumulate dust.

The present invention is disclosed above by preferred embodiments. However, the preferred embodiments should not be interpreted as restrictive of the claims of the present invention. Hence, all equivalent structural changes made to the aforesaid preferred embodiments in accordance with the specification and drawings of the present invention should fall within the claims of the present invention.

What is claimed is:

1. A waterproof structure for use with an electronic device, the electronic device having a gap, the waterproof structure comprising:
    a casing for enclosing a periphery of the electronic device; and
    a waterproof gasket clamped between the casing and the electronic device and comprising a fixing portion fixed to the casing and a first abutting portion and a second abutting portion which extend from the fixing portion, wherein the first abutting portion and the second abutting portion abut against two opposite sides of the gap of the electronic device, respectively;
    wherein the first abutting portion and the second abutting portion have a first abutting end and a second abutting end, respectively, to allow the first abutting end of the first abutting portion to abut against one of two opposite sides of the gap and allow the second abutting end of the second abutting portion to abut against another one of the two opposite sides of the gap.

2. The waterproof structure of claim 1, wherein a recess is formed between the first abutting portion and the second abutting portion of the waterproof gasket, wherein a plurality of serrate third abutting portions is disposed at the waterproof gasket and corresponds in position to the recess.

3. The waterproof structure of claim 1, wherein the first abutting end is spaced apart from the fixing portion by a first distance, whereas the second abutting end is spaced apart from the fixing portion by a second distance larger than the first distance.

4. The waterproof structure of claim 1, wherein a central line is defined between the first abutting portion and the second abutting portion and corresponds in position to the gap of the electronic device.

5. The waterproof structure of claim 1, wherein the first abutting portion and the second abutting portion are two abutting legs spaced apart from, but adjacent to, each other.

6. The waterproof structure of claim 1, wherein the gap is formed between a display panel and a body of the electronic device, and the first abutting end abuts against the display panel and the second abutting end abuts against the body on opposite sides of the gap.

7. A waterproof structure for use with an electronic device, the electronic device having a gap, the waterproof structure comprising:
    a casing for enclosing a periphery of the electronic device; and
    a waterproof gasket clamped between the casing and the electronic device and comprising a fixing portion fixed to the casing and a first abutting portion and a second abutting portion which extend from the fixing portion, wherein the first abutting portion and the second abutting portion abut against two opposite sides of the gap of the electronic device, respectively;
    wherein the waterproof gasket further comprises an extending portion extending from the fixing portion and connected fixedly to the casing;

wherein a first recess is formed between the first abutting portion and the second abutting portion of the waterproof gasket, whereas a second recess is formed between the extending portion and the first abutting portion, with the first abutting portion disposed between the first recess and the second recess.

8. The waterproof structure of claim 7, wherein the first abutting portion, the second abutting portion, and the extending portion are triangular ridges, respectively.

9. The waterproof structure of claim 7, wherein the gap is formed between a display panel and a body of the electronic device, and the first abutting portion abuts against the display panel and the second abutting portion abuts against the body on opposite sides of the gap.

10. A waterproof structure for use with an electronic device, the electronic device having a gap, the waterproof structure comprising:
- a casing for enclosing a periphery of the electronic device; and
- a waterproof gasket clamped between the casing and the electronic device and comprising a fixing portion fixed to the casing and a first abutting portion and a second abutting portion which extend from the fixing portion, wherein the first abutting portion and the second abutting portion abut against two opposite sides of the gap of the electronic device, respectively;

wherein the fixing portion of the waterproof gasket has a first positioning portion, and the casing has a second positioning portion corresponding in position to the first positioning portion, such that the first positioning portion and the second positioning portion are coupled to each other and thus positioned; and wherein one of the first positioning portion and the second positioning portion is a groove, whereas another one of the first positioning portion and the second positioning portion is a rib corresponding in position to the groove, inserted into the groove, and thus positioned.

11. The waterproof structure of claim 10, wherein a central line is defined between the first abutting portion and the second abutting portion such that the first positioning portion is positioned at the central line.

12. The waterproof structure of claim 10, wherein the gap is formed between a display panel and a body of the electronic device, and the first abutting portion abuts against the display panel and the second abutting portion abuts against the body on opposite sides of the gap.

* * * * *